(12) United States Patent
Hilliard

(10) Patent No.: US 7,879,474 B2
(45) Date of Patent: Feb. 1, 2011

(54) SOLID OXIDE ELECTROLYTIC DEVICE

(76) Inventor: Donald Bennett Hilliard, 3050 N. Fontana, Tucson, AZ (US) 85705

( * ) Notice: Subject to any disclaimer, the term of this patent is extended or adjusted under 35 U.S.C. 154(b) by 69 days.

(21) Appl. No.: 11/980,242

(22) Filed: Oct. 29, 2007

(65) Prior Publication Data
US 2008/0131749 A1    Jun. 5, 2008

Related U.S. Application Data

(63) Continuation of application No. 10/411,938, filed on Apr. 10, 2003, now abandoned.

(60) Provisional application No. 60/371,891, filed on Apr. 10, 2002.

(51) Int. Cl.
*H01M 8/12* (2006.01)

(52) U.S. Cl. .................. 429/32; 429/479; 429/491; 429/496

(58) Field of Classification Search ........................ None
See application file for complete search history.

(56) References Cited

U.S. PATENT DOCUMENTS 5,171,645 A * 12/1992 Khandkar .................. 429/33
6,794,075 B2 * 9/2004 Steele et al. .................. 429/30
2003/0194592 A1 * 10/2003 Hilliard ........................ 429/32
2005/0074650 A1 * 4/2005 Sridhar et al. ................. 429/30

* cited by examiner

*Primary Examiner*—Patrick Ryan
*Assistant Examiner*—Alix Echelmeyer

(57) ABSTRACT

An interconnect structure is disclosed for use in solid oxide electrolytic devices that use chrome-containing components, such as solid oxide fuel cells and solid oxide oxygen-generators. The invention provides a reliable and durable interconnect for both structural and electrical components of such devices. In general, the interconnect structure relies on a dual-layer, high-temperature seal which provides an effective diffusion barrier for both chrome and oxygen. As a result of the described interconnect, corrosion or loss in electrical conductivity in such solid oxide electrolytic devices is avoided. Also, a novel structure for such solid oxide electrolytic devices is disclosed, which provides an economical and high-integrity structure that utilizes the disclosed interconnect structure. A result of the present invention is that thin film solid oxide fuel cells and solid oxide oxygen generators may be fabricated using only metal alloys as bulk components.

13 Claims, 11 Drawing Sheets (oxygen generator mode)

(fuel cell mode)

SOLID OXIDE ELECTROLYTIC DEVICE

This application is a continuation of U.S. patent application Ser. No. 10/411,938, filed Apr. 10, 2003 now abandoned and claims priority date of U.S. provisional application No. 60/371,891, filed Apr. 10, 2002.

BACKGROUND OF THE INVENTION

1. Field of the Invention

The present invention relates in general to solid oxide electrolytic devices, including solid oxide fuel cells (SOFC's) and oxygen generation systems (OGS') and novel interconnect structures in such devices. In particular, the invention relates to the use of chrome-containing alloys in these devices, and the use of protective layers deposited to prevent corrosion, degradation, and/or increased electrical resistivity of the alloys.

2. Description of the Related Art

Solid state devices based on high-temperature (>600° C.) solid oxide electrolyte behavior have become increasingly important for a variety of applications. Such devices are of interest as viable options for power generating fuel cells, as well as for producing pure oxygen, hydrogen, and other such gases that may be produced through dissociation of oxygen-bearing gases.

It has been found in the prior art that chrome and chrome-containing metallic alloys, referred to variously as superalloys, bimetals, "Met-X", Siemens "Plansee", "CRF" and the like, provide an economical and suitable material for the metallic components of such solid oxide electrolytic devices as solid oxide fuel cells (SOFC's) and oxygen generators. Problems exist, however, in preventing the chrome in such alloys from diffusing and/or becoming oxidized in the high-temperature (>800 C), oxygen-rich environments common to such devices. Degradation of the device structure, due to chrome oxidation and/or diffusion, can result in failure of the device, due to failure of an integral seal, an increase in internal resistance, or contamination of device components.

It has been found in the prior art that use of certain electrically conductive multicomponent oxides, typically of a defective perovskite structure, can be deposited on these alloys to form a diffusion barrier that blocks, at least initially, sublimation of Cr into the gaseous environment of the device. Also, metals may be deposited onto the Cr alloy component, the component annealed in oxygen environment to form a conducting oxide phase containing Cr, wherein the Cr-containing oxide phase is then found to be an effective diffusion barrier, as well. This latter approach is taught in U.S. Pat. No. 6,054,231 to Virkar and England. In Virkar, the proposed use of such a chrome-containing barrier layer was to essentially act as a sink for trapping the Cr as it diffused out of the Cr-based alloy component. However, since the oxide phase of Virkar does not actually stop Cr diffusion, Cr eventually diffuses to the gas/solid interface, where it can sublime, albeit, at a slower rate than were the oxide barrier layer not present. This latter sort of a barrier is not an ideal solution for stopping degradation in the relevant devices, since it does not stop Cr diffusion, but only impedes it. At the same time, the use of these thick-film, multi-component oxides present complex reproducibility issues. In part, it is found in the present invention that such thick-film barrier thicknesses (>10 um), as well as their suitable deposition methods, will tend to result in a coating/substrate system that is not mechanically sound, and will result in fracturing and stress-induced diffusion across the thick films of these prior art accounts. These conducting oxides were previously deposited by methods that provide quite thick films, usually of thicknesses greater than 25 um, in order to provide a sufficiently long lifetime for device operation. As reported by workers using such an approach, this proved to be quite expensive in materials usage.

Additionally, the formation of such defective oxides that contain chrome oxide have been found, in the present invention, to result in a material that can be easily modified at its surface in the relevant device environments. The combination of high temperatures and electrical fields found in SOFC's and OGS' devices can readily alter the valence states existing at the surface of such electrically conducting oxides, so that various reduction and diffusion processes are activated, resulting in eventual degradation of the diffusion-barrier quality of the oxide material.

SUMMARY OF THE INVENTION

In accordance with the preferred embodiments, the present invention provides a structure for use in such solid oxide electrolytic devices as solid oxide fuel cells (SOFC's) and solid-state oxygen generator systems (OGS'). Some of the novel aspects of the disclosed structure are provided by the ability to utilize various Cr-containing alloys in the relevant devices, without degradation of the device performance due to unwanted reactions or diffusion processes occurring between the alloy and the remaining device structure. More particularly, it has been discovered that the dual diffusion barrier approach, as disclosed in earlier U.S. patent application Ser. No. 09/968,418, by the present applicant, can prove particularly advantageous when implemented using the particular material structure disclosed herein.

The present invention provides an interconnect structure for use in solid oxide electrolytic devices, which interconnect may be used to join chrome-containing components to adjacent structures of the device, and more particularly, as an electrically conductive interconnect between chrome-containing components and adjacent electrode or electrolyte structures. The structure disclosed separates and seals the various chrome-containing components of the device from oxidizing environments present within such devices, and, in so doing, prevents device degradation. While the failure mechanisms that degrade performance in these high-temperature devices can be complex and interdependent, the disclosed interconnect structure is found to prevent, for example, Cr and oxygen from uniting to form a high-resistivity, $Cr_2O_3$ layer, as well as to prevent the undesirable diffusion of Cr—due to either gaseous or solid state diffusion—to other surfaces and interfaces within the device. The invention further provides a novel solid oxide electrolytic device structure that may be utilized for either solid oxide fuel cells (SOFC's) or solid state oxygen generators (OGS'). This novel device structure utilizes the diffusion-barrier properties of the disclosed interconnect to implement a solid metal support structure for electrolytic membranes in these same devices.

The present invention overcomes the problems encountered in the prior art through the use of a thin film, complementary dual-layer, high-temperature sealing structure. The dual-layer structure disclosed utilizes at least two different material layers. A first layer comprises a Cr-containing conductive oxide (CCCO) that is, in the first preferred embodiment, formed through the reaction of a vapor-deposited, multicomponent oxide of the group consisting of, but not limited to, various manganites, manganates, cobaltites, chromites, molybdenates, lanthanites, and other oxides that, when deposited as a thin film (<10 micrometers), can form an electrically conductive Cr-containing oxide phase that is stable with respect to an underlying Cr-containing alloy support structure at device operation temperatures (600-800° C.). The first CCCO layer is preferably formed through the reaction of a dense oxide film with an underlying alloy substrate. For the most rugged device operating characteristics, the Cr-alloy structure is of a composition that provides a good thermal expansion match to the solid oxide electrolyte used in the device, such as the materials previously discussed in the background of the invention. However, the dual-layer diffusion barrier disclosed is also found to be effective on much more economical Cr-containing alloys, such as many of the commercially available martensitic and ferritic steels. Also, due to novel aspects of the disclosed device structure, such relatively economical alloys, with less well-matched coefficients of thermal expansion (C.T.E.'s), may be implemented as the bulk components of the electrolytic device.

The CCCO layer is operational in the presently disclosed interconnect structure because it is subsequently coated with a second layer of protective material that provides no effective chemical potential for causing the diffusion of Cr out of the CCCO. The second layer is deposited onto the first layer so as to separate and protect the first layer from the degrading effects of exposure to the gaseous/galvanic environment of the electrolytic device. Platinum metal is found to provide such protective characteristics in the present invention, with an economically viable thickness (<0.5 micrometers). Whereas Cr—Pt intermetallics will normally form quite easily at the high temperatures used in solid oxide electrolytic devices, the Cr bonding in the CCCO is sufficient to prevent such an intermetallic from forming, except perhaps at the immediate CCCO/Pt interface. The second layer is also composed of a second material that does not allow potentially degrading gases from contacting or diffusing to the CCCO, thereby comprising a gas diffusion barrier (GDB). The GDB layer also prevents the occurrence of a three-phase boundary between metal electrode, the CCCO layer, and the gas environment of the electrolytic device interior. The prevention of such a three-phase boundary is found to further prevent activation of undesirable diffusion processes.

The second, GDB, layer is also of relatively high electrical conductivity, so that overall resistance of the device is lowered. When proper deposition methods and materials are utilized to produce high-integrity sealing layers, the invention allows for use of electrically conductive Cr-containing materials that would degrade under normal operating conditions for the relevant devices. For example, such defective oxide, electrically conductive materials as those typically used in the first layer will typically possess more than one possible valency in oxygen bonding, wherein unwanted diffusion of various components of the defective oxide may be activated by the galvanic environment of the device. In the invention's preferred embodiment, the interconnect structure of the present invention may be scaled to a relatively thin (e.g., 2,000 angstroms) aspect, utilizing a minimum of materials, while still providing useful ($10^5$ hours) device lifetimes and stable, reproducible performance. Such scales easily allow fabrication of the resulting electrolytic device withing precision tolerances.

It is discovered in the present invention that the methods and thick film structures of the prior art utilizing these conductive oxides were not effective diffusion barriers for the desired application and give unsatisfactory device lifetimes and performance. Surprisingly, however, it has been found, in the present invention, that thin films of thicknesses 100× thinner than those previously used actually provide a more effective diffusion barrier compared to those prior art thick films, when such thin films are incorporated into the dual layer, complementary interconnect structure disclosed herein, and deposited—rather than by non-vapor-deposition methods such as plasma spray, thermal spray coating and spray pyrolisis—by true vacuum vapor deposition methods. The use of vapor deposition techniques is preferred to achieve sufficiently dense films. When the electrically conductive Cr-containing oxide phase is formed as thin film, which is of thickness less than 10 um, and is subsequently coated with a thin film—again, less than 10 um—of a suitable GDB material, the resulting structure may then be subjected to prolonged use as an interconnect in the solid oxide device.

Subsequently, the disclosed dual diffusion barrier is used in a novel solid oxide electrolytic device design that may serve in either a fuel cell or a gas separation device. Rather than using nickel or various porous substrates, the diffusion barrier allows for an electrode support structure to be composed of a Cr alloy component covered with the disclosed thin film interconnect structure. As a result, instead of porous ceramics, bulk, industrially available alloys may be used as either a cathodic or anodic support structure in the device. The resulting metallic support structure of the preferred embodiments is in a sheet form that is patterned with a plurality of small through-holes, which holes provide access to a deposited thin or thick film of the solid oxide electrolyte, the latter which spans and seals one side of the planar support structure. The perforated support structure then provides a first electrode of the device. The opposite side of the solid oxide electrolyte film is then patterned with a second electrode, which is deposited so as to provide a second, counter-electrode structure with a through-hole pattern similar to that of the first electrode. Optionally, a porous conducting over layer may then be deposited over either first or second electrode grids to provide additional three-phase boundaries in the electrode/electrolyte/gas system, to provide various reforming functions, or to provide other functionality relevant to device operation. In one preferred embodiment, the porous material is vapor deposited platinum black, though it may be any of the non-bulk porous electrode materials used in the prior art.

As a result of small through-hole size and stress relieving structures incorporated in the thin film electrolyte, macroscopic strain and stress is substantially avoided in the disclosed device, so that thermal expansion coefficients do not need to be as precisely matched as is required in the case of more macroscopic electrolytic membranes. The ability to use materials of less well-matched C.T.E. is also due to the higher stresses sustainable by vapor deposited thin/thick film structures of the present invention, as opposed to bulk ceramic structures or films created from sprayed nanocrystalline particles. The resulting electrode/electrolyte assembly, which exists on and incorporates the electrode support structure, may then be easily integrated into a variety of SOFC or OGS geometries. Because all bulk components of the disclosed device structure are coated with the disclosed interconnect structure, the disclosed device requires only relatively trivial high temperature seals between the similar alloys that comprise its bulk components.

The thin film solid oxide membrane is disclosed in the first preferred embodiments as yttria-stabilized zirconia (YSZ). However, the solid oxide electrolyte may comprise any of the solid electrolytes used in the art. In addition, a novel thin film electrolyte structure is disclosed which is a stabilized cubic ceria structure that is terminated at its interface with 10-100 nm of YSZ. The resulting thin film electrolyte provides increased chemical stability over prior ceria electrolytes, while not significantly reducing oxygen diffusion rates.

Accordingly, it is an object of the present invention to provide an interconnect structure which is suitable for the high temperature environment of solid oxide fuel cells and electrolyzers.

Another object of the present invention is to provide an interconnect structure for use with solid oxide electrolytes which enables stable, long-term operation of such devices under normal operating conditions.

Yet another object of the present invention is to allow the use of chrome-containing alloys in solid oxide electrolyte devices, while preventing oxidation of the chrome during operation.

Another object of the present invention is to provide a means for preventing diffusion of chrome and other active metal from metallic components of solid oxide electrolytic devices Another objective of the present invention is to provide a hydrogen-tight seal for use in solid electrolyte devices.

Still another objective of the present invention is to provide an economical and compact sealing solution for solid oxide electrolyte devices.

Still another objective of the present invention is to provide an economical and compact electrical interconnect for solid oxide electrolyte devices.

Yet another objective of the present invention is to provide a dual layer structure which serves as both a chrome barrier and an oxygen barrier at typical solid oxide electrolytic temperatures (e.g., 800 C).

Another object of the invention is to provide a novel fuel cell design that utilizes only bulk, machinable metal alloys as support structures.

Another object of the present invention is to provide an oxygen generator that utilizes only bulk, machinable metal alloys as support structures.

Another object of the present invention is to provide a thin film solid oxide fuel cell structure which does not utilize porous bulk ceramics, or nickel, as a support structure.

Another object of the present invention is to provide a general-use, high-temperature corrosion/diffusion barrier for Cr-containing ferrous alloys.

Another object of the present invention is to eliminate the need for high temperature, bulk ceramic seals in solid oxide electrolytic devices.

Another object of the present invention is to provide a thin film solid oxide electrolytic device that possesses the low-temperature benefits of ceria-based electrolytes, with the chemical stability of zirconia-based electrolytes.

Other objects, advantages and novel features of the invention will become apparent from the following description thereof.

DESCRIPTION OF THE PREFERRED EMBODIMENTS

The following description and FIG. 1-11 of the drawings depict various embodiments of the present invention. The embodiments set forth herein are provided to convey the scope of the invention to those skilled in the art. While the invention will be described in conjunction with the preferred embodiments, various alternative embodiments to the structures and methods illustrated herein may be employed without departing from the principles of the invention described herein. Like numerals are used for like and corresponding parts in the various drawings.

Figure 1:
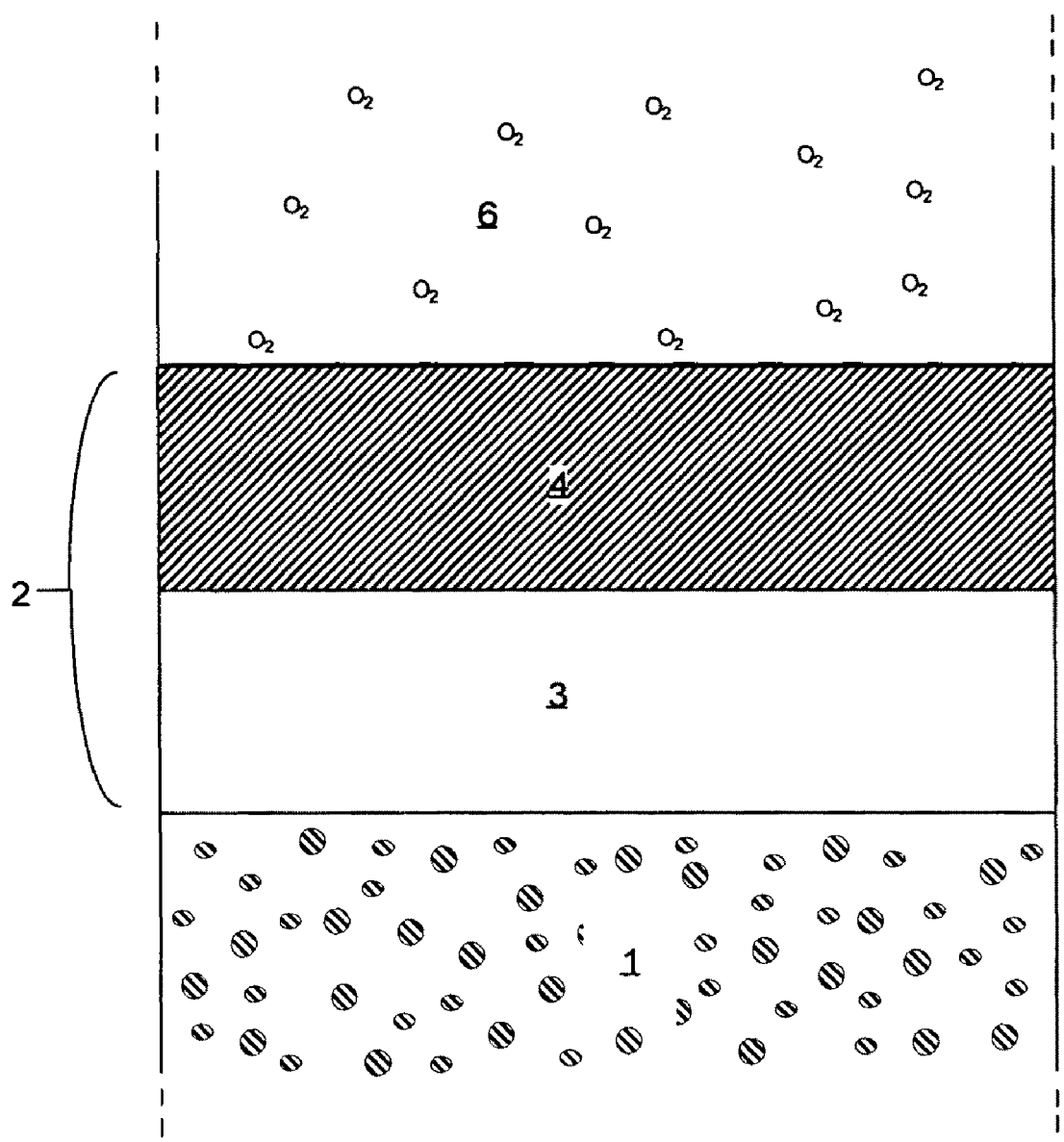
FIG. 1 is a cross-section of the dual-diffusion-barrier of present invention as incorporated within a typical solid oxide electrolytic device.

FIG. 1 is a preferred embodiment of the present invention, wherein a chrome-containing metallic alloy structure (1) in a solid oxide electrolytic device is coated with the disclosed dual-layer interconnect structure (2). The component may be a bipolar connector plate used in solid oxide fuel cells and oxygen generators, or the supporting electrode disclosed in later figures. It may be noted from the preferred embodiments of FIG. 1 that a first CCCO layer (3) separates a second GDB layer (4) from the underlying chrome alloy structure (1). The CCCO layer may comprise various Cr-containing, electrically conducting manganites, manganates, cobaltites, chromites, molybdenates, or lanthanites. In the first preferred embodiment, the CCCO layer is composed of a LaSrCrMnO polycrystalline phase, and the GDB layer is platinum, though it may also comprise Ni metal or alloy in some applications. Without such a CCCO layer, at typical device operating temperatures, the Cr atoms will diffuse into the Pt to form such intermetallics as $Cr_3Pt$ and CrPt, which will subsequently result in an electrically insulating layer forming at the Pt surface, and eventual sublimation of Cr from the surface. The CCCO layer, however, provides sufficient binding energy to the Cr atoms, so that diffusion of Cr into the Pt is no longer chemically activated at device operating temperatures. At the same time, the Pt protects the CCCO layer from being degraded due to undesirable interfacial effects that would otherwise occur between the CCCO surface and the gaseous environment inside the device. These unwanted interfacial effects can include galvanic effects that activate reduction or otherwise effect the Cr—O bonding at the CCCO surface so that Cr sublimes or diffuses from the surface. Furthermore, when the gas media (6) of the device contains oxygen, the GDB layer prevents diffusion of oxygen from the gas media to the CCCO/alloy interface to form a low conductivity $Cr_2O_3$ layer.

In the first preferred embodiment the CCCO layer is most easily formed by first depositing 100-10,000 nanometers of an electrically conducting manganate, such as $(La_xSr_{1-x})MnO$ (LSM), on the surface of the Cr alloy component by such energetic deposition means as sputtering. Subsequently, the component is rapidly annealed with a first anneal to form an intermediate phase between the LSM coating and the Cr in the underlying alloy, thus producing a LaSrCrMnO (LSCM) CCCO layer. It is sufficient to perform the first anneal in air, with a fast ramp (typically less than 15 minutes) to 950° C., where the component is held for about fifteen minutes, depending on the composition and thickness, before cooling back down to room temperature in about fifteen minutes. This fast anneal allows for the LSCM CCCO layer to form without substantial formation of a $Cr_2O_3$ layer at the alloy-LSCM interface. Subsequently, the Pt GDB layer is deposited onto the LSCM layer, after which the resulting component is subjected to a second anneal similar to the first anneal. The second anneal is preferred to equilibrate the resulting heterostructure before subsequent processing, as well as to promote adhesion within the thin film stack. In the first preferred embodiment, both CCCO layer and Pt layer are less than one micrometer in thickness, with the Pt layer found most effective at thicknesses between 0.1 and 0.5 micrometers.

Figure 2:
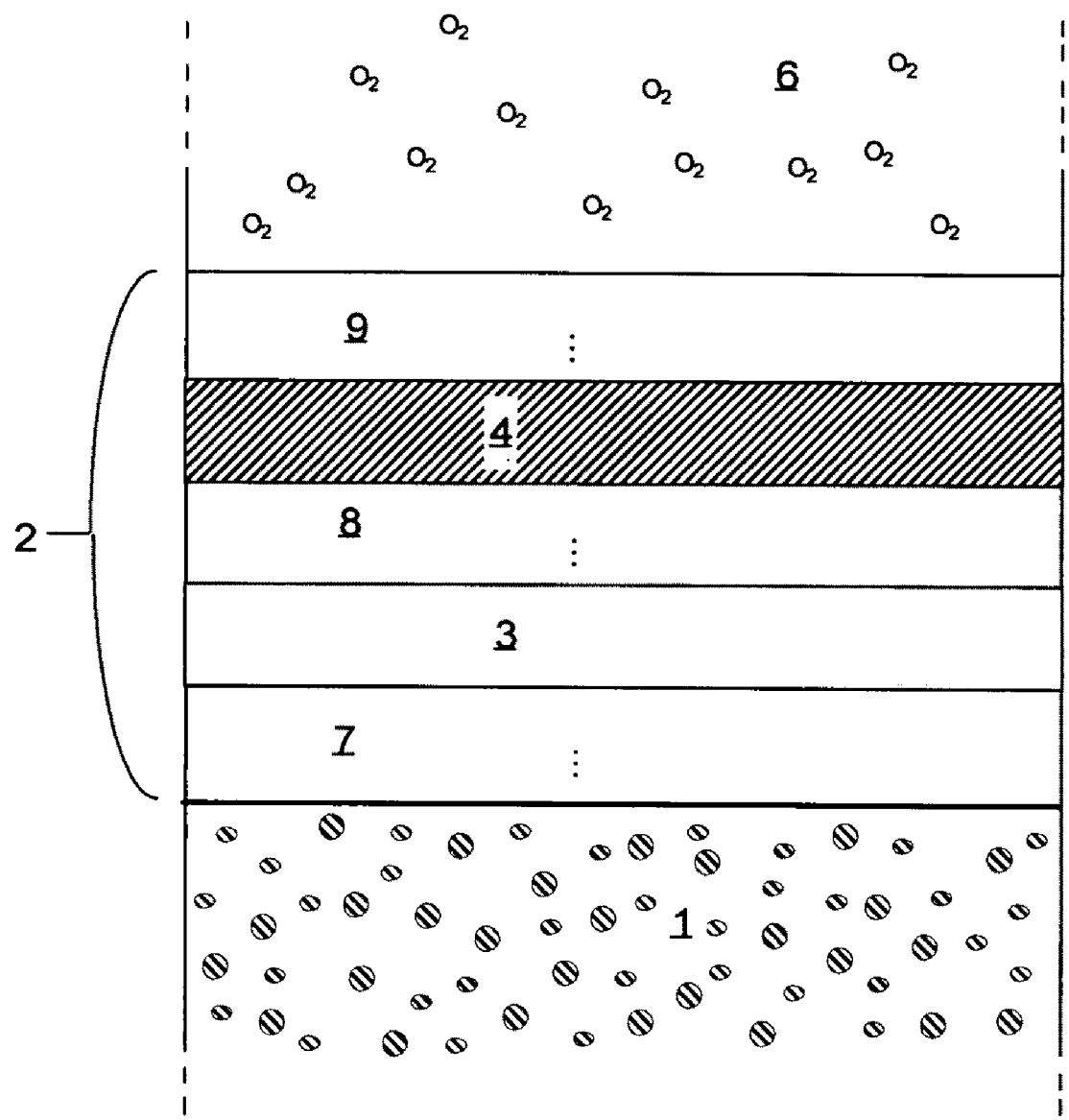
FIG. 2 is a cross-section of the dual-diffusion-barrier in an alternative embodiment of the present invention.

In the preferred embodiment, dense and stoichiometric materials for the dual-layer interconnect structure (2) of FIG. 1 are achieved through the use of energetic deposition techniques, such as plasma sputtering, pulsed laser deposition, cathodic arc deposition, or ion-assisted sputter deposition. While these methods may be used to deposit either thin films ($\leq$10 microns) or thick films ($\geq$10 microns), one of the objectives of the present invention is to allow unusually thin, substantially non-porous, layers to provide the desired interconnect integrity. It is found in the present invention that thin films, and less than one micrometer thin films in particular, of the CCCO and GDB layers are actually preferred to avoid fracture and thus, accelerated failure from occurring in the intended device. The material interfaces in FIGS. 1-2 are abrupt in the preferred embodiment, but may also be diffuse to suit the particular device and economics at hand.

An alternative embodiment of the present invention provides for additional layers to be included in the dual-layer interconnect structure (2) for added functionality. FIG. 2 is a cross-section of an alternative structure that has the dual-layer CCCO/GDB diffusion barrier imbedded within it, and operates in accordance with the principles already described. In this alternative embodiment, a first interfacial region (7) exists between the chrome alloy structure (1) and CCCO layer (3); a second interfacial region (8) exists between the CCCO layer (3) and GDB layer (4); and, a third interfacial region (9) exists between the GDB layer (4) and the gaseous media (6) that exists within the solid-oxide electrolytic device. In the embodiments of FIGS. 1-2, the gaseous media (6) is an oxygen-rich gas that may exist in an OGS or an SOFC. One or more of these interfacial regions may be occupied by additional layers that may be either a repetition of the CCCO/GDB scheme disclosed, or supplementary layers for providing additional functionality. The additional functionality of these supplemental layers may include adhesion-promoting layers, strain-compensating layers, additional diffusion barriers, catalytic layers, thermal barriers, and so forth. These additional layers may also include such lanthanites, chromites, cobaltites, ruthenites, manganites, and other such conductive oxides that have been discussed in the prior art. In any case, the benefits of the present invention are acquired through incorporation of the required sequence of materials and sealing layers (Cr-containing alloy, thin film CCCO layer, and thin film GDB layer). In the alternative embodiments of FIG. 2, in which additional material layers may be deposited to form the first interfacial region (7), it is likely that the desired final composition of the CCCO layer should be obtained in the vapor deposition process itself, since obtaining Cr diffusion from the alloy may be impeded by any additional material layers of the first interfacial region (7).

It is to be understood that the precise materials utilized are but a preferred embodiment of the invention. For example, other electrically conducting, Cr-containing oxides other than LaSrCrMnO may also be found to serve the role of the CCCO layer in the present invention. In some cases, the GDB layer may also be composed of metallic layers other than Pt. Similar performance may also be obtained through the use of metallic compositions including Pt, Au, Ni, Mo, and Nb. However, in the case of single-element metals, Pt is preferred, in the present disclosure, to provide the required degree of both adhesion and oxygen resistance.

It is also to be understood that the compositions suggested are nominal, as small compositional variations due to doping or contamination would typically not compromise the operation of the invention. It is also to be understood that, while diffusion of chrome and oxygen have been found, in the present invention, to be the dominant mechanism of failure in the devices discussed, the disclosed sealing structure of FIGS. 1-2 is also effective against a myriad of other failure mechanisms, including stress/strain-related failure, galvanic corrosion, and failure due to diffusion of less active constituents present in such devices, e.g., Fe, Ni, etc. As such, the terms "chrome-containing conducting oxide" and "gas diffusion barrier" are used to positively identify components of the disclosed structure in accordance with their best understood functions.

Figure 3:
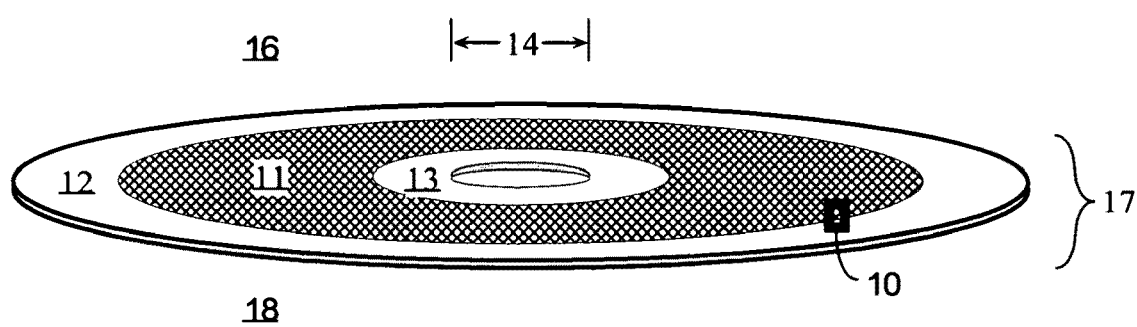
FIG. 3 is a perspective view of the disclosed electrode support structure, showing the sealing and active regions.

The underlying Cr alloy in FIGS. 1-2 can be fashioned for providing a variety of structural elements in a variety of device designs, including housing structures, electrode structures, interconnect structures, etc. In the preferred embodiments, the underlying alloy is fashioned as either an anodic or cathodic electrode support structure, which, after the application of the dual diffusion barrier of FIGS. 1-2, will provide reliable performance in the high-temperature (typically 600-800° C.) environment of solid oxide electrolytic devices, such as a SOFC or OGS device. In particular, the electrode support structure (17), in FIG. 3, provides the bulk substrate material and shape for producing a resultant solid-oxide electrode/electrolyte assembly. Initially, the electrode support structure of FIG. 3 is fashioned as a thin planar element, which has an active region (11) that provides a plurality of densely spaced through-holes that allow communication between the first side (16) and the second side (18) of the planar element, so that the active region of the support structure is perforated. A magnified perspective of the electrode support structure is shown in the captioned view of FIG. 4, which corresponds to the outlined box (10) in FIG. 3. The remaining planar regions of the electrode support structure comprise inner mating surfaces (13) and outer mating surfaces (12), which exist on either side of the structure, and provide a sealing surface to the gas manifold components of the electrolytic device.

Figure 4:
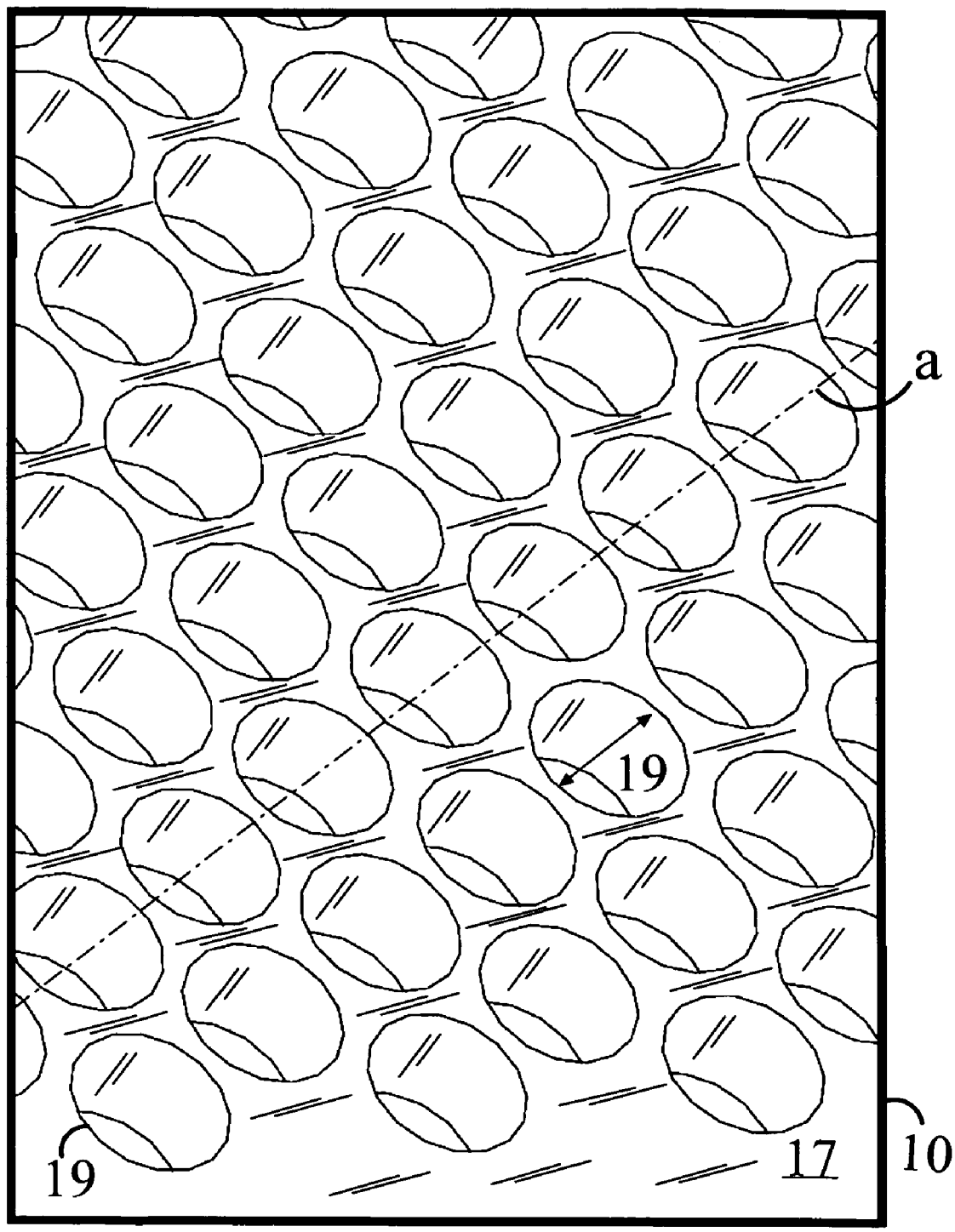
FIG. 4 is a magnified perspective view of the electrode support structure.

The electrode support structure (17) of FIG. 3-4, may be fashioned from one of the commonly available Cr-containing alloys discussed earlier, such as Hastalloy™ stock, but is preferably fashioned from one of the bulk alloys developed for close thermal expansion match to YSZ, such as Met-X or Pansee alloys. The bulk alloy forming the electrode support structure (17) is coated and processed so as to have the disclosed dual-layer diffusion barrier covering all its surfaces. Conformal coating of the initial alloy planar element may be readily achieved with standard physical vapor deposition techniques, since the aspect ratio of the through-holes (19), in FIG. 4, is, preferably, sufficiently close to unity, so that directional coating processes will provide the required conformal coating.

After application of the disclosed diffusion barrier, using the preferred platinum termination layer, the electrode support structure of FIG. 3-4 can then be repeatedly cycled as either a cathodic or anodic support structure in a variety of oxidizing/corrosive environments without degradation. The electrode support structure is further processed and coated to provide the remaining solid oxide electrolyte and electrode structures of the resulting solid oxide electrode/electrolyte assembly.

In accordance with the first preferred embodiments, once the platinum-terminated structure of FIGS. 3-4 is produced, additional building up of thin film device structures may proceed in a variety of processes common to microelectronics industry. In the preferred embodiments, the structure of FIG. 4 is subsequently loaded with a sacrificial material (15), so that the through-holes (9) are filled with the sacrificial material, in FIG. 5. High-solids organic resins are found to adequately provide the desired attributes of the sacrificial material, in that they can be readily planarized to the material surface corresponding to the first side (16) of the electrode support structure (17), while providing a sufficiently smooth interface between the sacrificial material and the support structure (17). Such organic resins provide a suitable surface for subsequent deposition of the solid oxide electrolyte, and are easily removed by baking out the support structure after deposition of the electrolyte.

Figure 5:
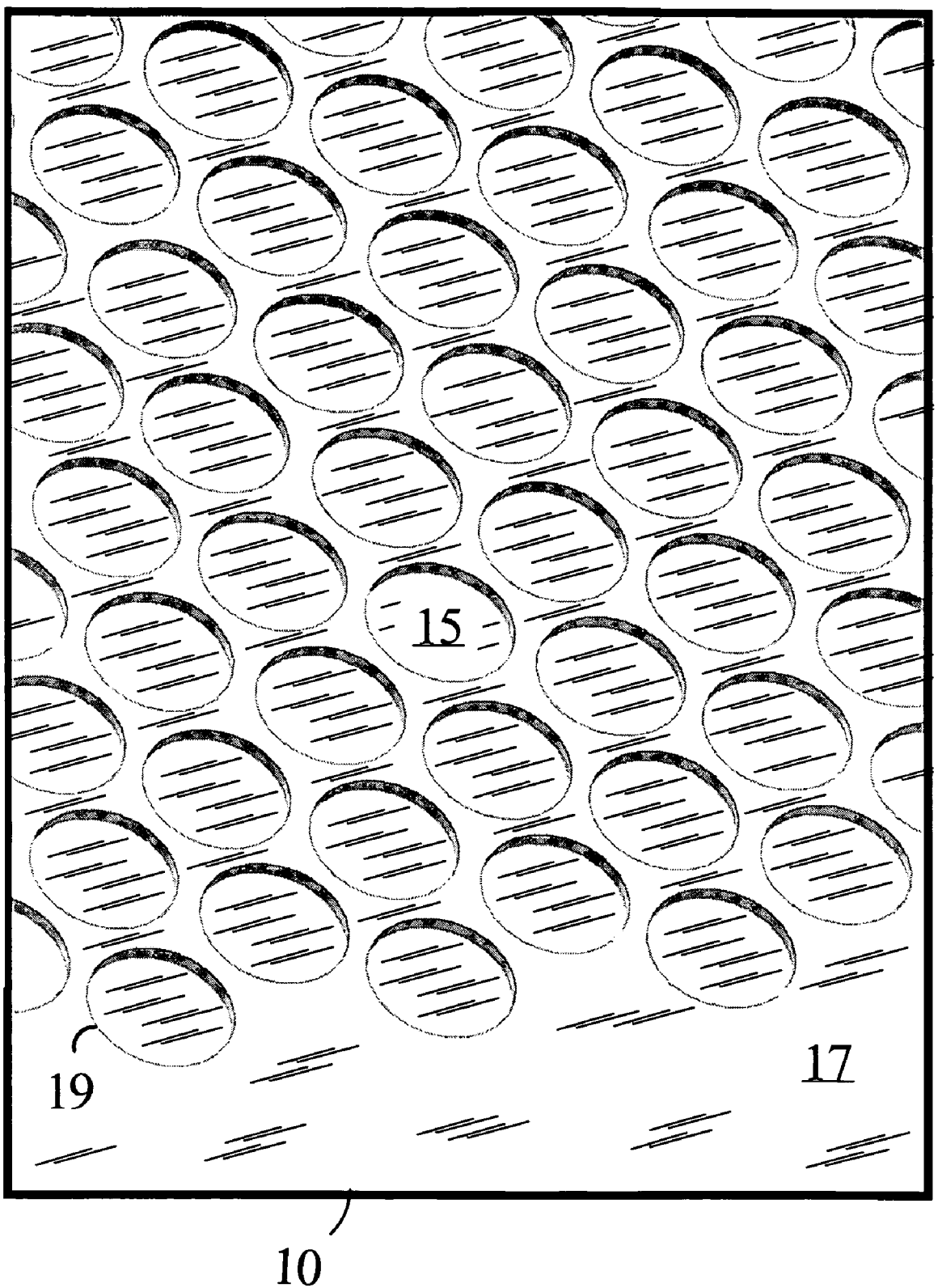
FIG. 5 is a magnified perspective view of the section of FIG. 4, with its through-hole pattern filled with planarized sacrificial material.

Alternatively, the sacrificial material used may be any of the wide variety of suitable sacrificial materials used in the manufacture of similarly scaled devices, such as those used in microelectronics packaging, MEMS fabrication, or sensor design. Accordingly, the sacrificial material may be one of a variety of resins, epoxies, or easily etched glasses or metals. The sacrificial material may be sufficiently planarized by a release mold, controlled wetting, or by lapping, but in any case, results in the surface of the first side of the electrode support structure becoming a continuous surface, as represented in FIG. 5.

The choice of sacrificial material will depend upon the solid oxide electrolyte to be subsequently deposited, and the chosen procedure by which the desired solid oxide phase (e.g., cubic zirconia) is attained. In the case that the electrode support structure and impregnated sacrificial material are to be maintained at a high temperature (>300° C.) during vapor deposition of the solid oxide electrolyte film, then the choice of sacrificial materials becomes restricted, since sacrificial organic compounds will degrade, and many sacrificial metals, such as Cu and Sb, begin to diffuse into the platinum GDB layer of the preferred support structure (17). For deposition temperatures below $T_g$, certain low temperature glasses that possess a C.T.E. well-matched to that of the electrolyte may be used. For example, in the case of YSZ, Schott glass FK5, with $T_g$ of 466° C., provides such properties, and is easily removed by buffered hydrofluoric solutions.

A solid oxide electrolyte and electrode structure are fabricated in the active region (11) of the electrode support structure, and are obtained through the deposition and patterning of thin- and/or thick-film device materials. These device materials include the solid oxide electrolyte as well as a material for a second electrode structure that acts as a counter-electrode to the support structure. These device materials are deposited onto the active region (11) of the electrode support structure (17), which device materials may be deposited from either the first side (16) or the second side (18) of the planar support structure.

In the preferred embodiments, the solid oxide electrolytic material may be deposited at relatively low temperatures, and, after removal of the sacrificial material, annealed at high temperatures to achieve the desired phase. For example, YSZ can be deposited in a nanocrystalline (cubic), slightly compressively stressed, form at room temperature, using on-axis, unbalanced "Type II" magnetrons of the magnetron sputtering art. These nanocrystalline films may then be transformed into more fully crystallized (by x-ray diffraction analysis) cubic zirconia films by way of annealing these films at 800° C. in wet oxygen. Such temperatures are, as already discussed, easily accommodated by the disclosed supporting electrode structure. The electrolytic oxide should typically be deposited so as to be stress-free or somewhat compressively stressed, so that the electrolytic oxide film will remain after removal of the sacrificial material and will withstand device temperatures with alloy support structures composed of slightly larger C.T.E (coefficient of thermal expansion) than that of the electrolyte.

Alternatively, deposition of the solid oxide electrolyte (20) may be performed at elevated substrate temperatures, so that a larger-grained polycrystalline phase may be acquired as-deposited. Such elevated temperatures typically require that the sacrificial material be inorganic.

The solid oxide electrolyte material is deposited on this first side of the planarized support structure (17), with holes filled by sacrificial material, so that the electrolyte is deposited as a substantially sheer film that seals the first side (16) of the support structure on which it is deposited. In this way, the solid oxide electrolyte (20), which hermetically and electrically separates the electrode support structure from a subsequently deposited counter-electrode structure, is formed. In the first preferred embodiments, this solid oxide electrolyte is deposited for a resulting electrolyte thickness corresponding to a thin film (<10 um). The sacrificial material (15) may then be etched away to provide a resulting structure that allows access to either side of the solid oxide electrolyte film (20), in FIG. 6. With reference to the electrode support structure (17) of FIG. 3, the solid oxide electrolyte (20) is deposited over all regions of the first side of the electrode support structure, so that the outer mating surface (12), the inner mating surface (13), and the active region (11) on the first side (16) of the electrode support structure are all covered with the electronically insulating electrolyte (20). The solid oxide electrolyte layer (20) thereby allows for the subsequent metallic manifolds that contact the mating surfaces of the first side to be electronically insulated from the underlying electrode support structure.

While various materials have been found to provide desirable oxygen diffusivity, the solid oxide electrolyte of an alternative embodiment is a multilayer film that is formed by depositing yttria stabilized zirconia (YSZ) as the first and last layer of the resulting solid oxide electrolyte film. In this way, the stability of YSZ is obtained at the interface of the electrolyte/gas/electrode boundary, where less stable electrolytes, such as stabilized $CeO_2$, are found to reduce and deteriorate. In the preferred embodiment, YSZ is first sputter deposited in a multi-magnetron chamber possessing both a YSZ source and a $CeO_2$ source. The first 100 nm of the electrolyte is deposited as YSZ, at which point, the $CeO_2$ is deposited to provide the majority of the electrolyte thickness, which is typically 1-10 micrometers. The electrolyte deposition process then switches back to YSZ to terminate the electrolyte layer (20) with about 100 nm of YSZ. However, the electrolyte may be fabricated using different solid oxide electrolytes, laminated structures, or solid solutions of one or more solid oxide electrolytes.

Figure 6:
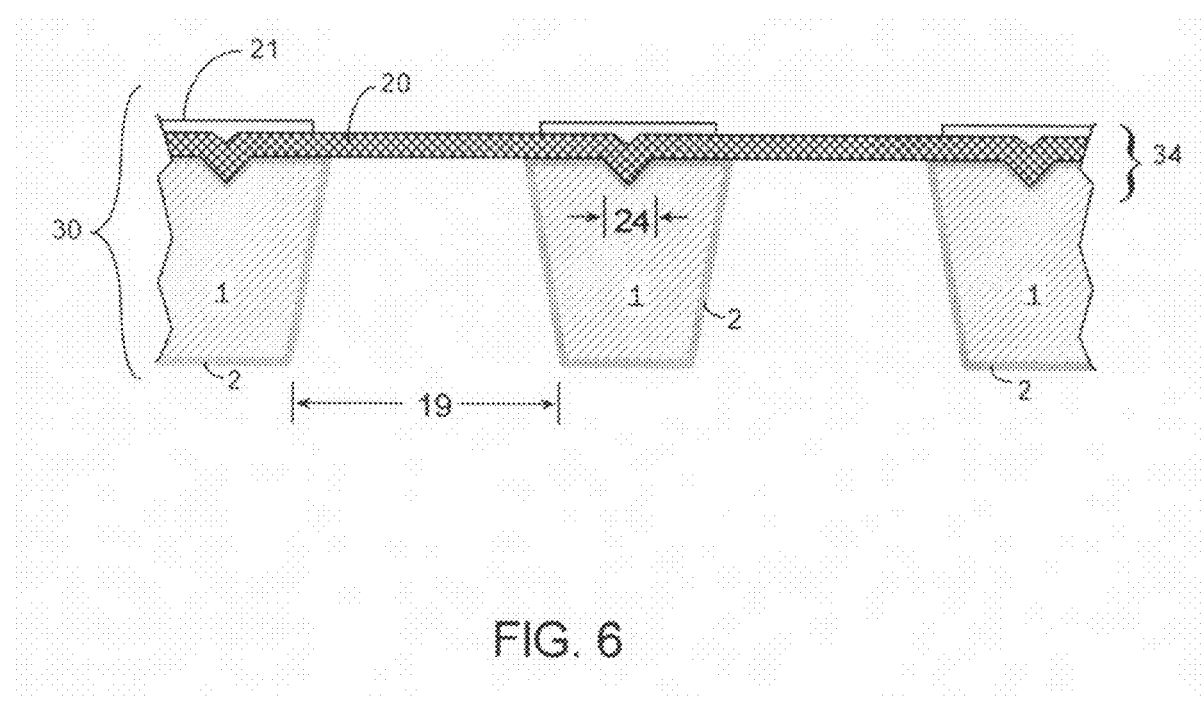
FIG. 6 is a magnified cross-section of a portion of the active region in the disclosed solid oxide electrode/electrolyte assembly, taken along dashed line 'a' in FIG. 4.

The electrode-supported electrode/electrolyte assembly (30) of the preferred embodiments, in FIG. 6, includes the electrode support structure (17), which includes the bulk alloy structure (1) and dual-layer interconnect structure (2). The electrode/electrolyte assembly (30) utilizes the electrode support structure to support a subsequently formed, thin/thick film, electrode/electrolyte structure (34) in the perforated active region (11) of the electrode support structure. This thin/thick film structure includes the solid oxide electrolyte (20) and a counter-electrode structure (21).

It may be noted that the electrode support structure, in FIG. 6, has surface relief features (24) between the through-holes (19), which place a discontinuity in the subsequently deposited solid oxide electrolyte film (20). While such relief features may comprise a variety of aspects, their main purpose is to provide discontinuities in the planarity of the thin-film solid oxide electrolyte, thereby providing means for relieving internal stresses that may accumulate in the electrolyte due to any mismatch between the C.T.E. of the electrolyte and that of the underlying alloy structure. Accordingly, such discontinuities may be preselected or randomly produced by grinding the original alloy structure (1) for a roughened texture. In some cases, it may be preferable to pattern the solid oxide film so as to provide discontinuities yielding similar surface relief structures. In any case, the surface relief provides a means for preventing internal stress in the solid oxide film from accumulating over any appreciable distance. As such, the surface relief should preferably be of the order or greater than the thickness of the solid oxide film. Accordingly, the electrolyte (20) of FIG. 6, which is about 2 micrometers thick, possesses surface relief features (24) that are greater than 1/10 the thickness of the electrolyte; and, in FIG. 6, the deviation from planarity is roughly ½ the thickness of the solid oxide electrolyte (20). Accordingly, if the surface relief features are to be provided by grinding or bead-blasting the alloy structure, the surface roughness should be greater than 1/10 of the electrolyte thickness. In the case, as in the preferred embodiments, that the electrolyte is formed with a sacrificial material in the through holes, the sacrificial material may then also be planarized with similar relief structures. As a result, the subsequently deposited electrolyte film, in FIG. 6, can possess the discussed surface relief structure over the through-hole region as well as in the area of contact with the electrode support structure (17). Such surface relief not only aids in the relief of mechanical stress, but also increases electrolyte surface area for increased device output. Such surface relief in the electrolyte film also provides a rough surface that enables discontinuous growth of porous electrode materials that may be subsequently deposited on the electrolyte.

After the electrolytic oxide film is deposited and the sacrificial material is removed from the through-holes of the electrode support structure, a Pt counter-electrode structure (21) may then be deposited on the side of the electrolytic oxide film opposite to the supporting electrode. This may be deposited by any of the thin/thick film techniques of the prior art, such as sputtering, evaporation, or screen printing. The patterning the counter-electrode structure, in the case that it is the more difficult to etch Pt metal, may be performed by the variety of the dry etching methods developed for Pt electrodes in ferroelectric non-volatile memory industry, though the relatively coarse features of the present electrode structures may be achieved simply through shadow masks.

The alloy structure (1) of the electrode support structure in FIG. 6 preferably comprises a material with C.T.E. sufficiently matched to that of the electrolyte, so that device operation temperatures do not substantially effect strain in the electrode/electrolyte structure (34). Alternatively, such as in the case of a zirconia electrolyte, wherein an alloy of slightly larger C.E.T. than the electrolyte is used—e.g., 316 stainless steel—it is recommended that the solid oxide electrolyte be deposited so as to result in a somewhat convex (or concave) shape in the space of the through-holes (9). This convex shape results preferably from the shape of the underlying sacrificial material during deposition, but may alternatively result from compressive stress. In either of the latter cases, heating of the electrode/electrolyte structure (34) will result in the application of tensile stress on the free-standing electrolytic film that exists over the through-holes, so that the original compressive stress or convex shape will allow for such tensile stress to be applied without film rupture.

It may be noted that, while the electrode support structure comprises an anode in later preferred embodiments disclosed in the present invention, either the electrode support structure (17) or the deposited counter-electrode structure (21) of the electrode/electrolyte assembly may comprise the anode of a resulting device. In either case, the resulting electrode/electrolyte assembly of the preferred embodiments incorporates the following sequence of layers: thin film platinum layer/thin film CCCO layer/bulk alloy/thin film CCCO layer/thin film platinum layer/thin film solid oxide electrolyte layer/thin film platinum layer.

Figure 7:
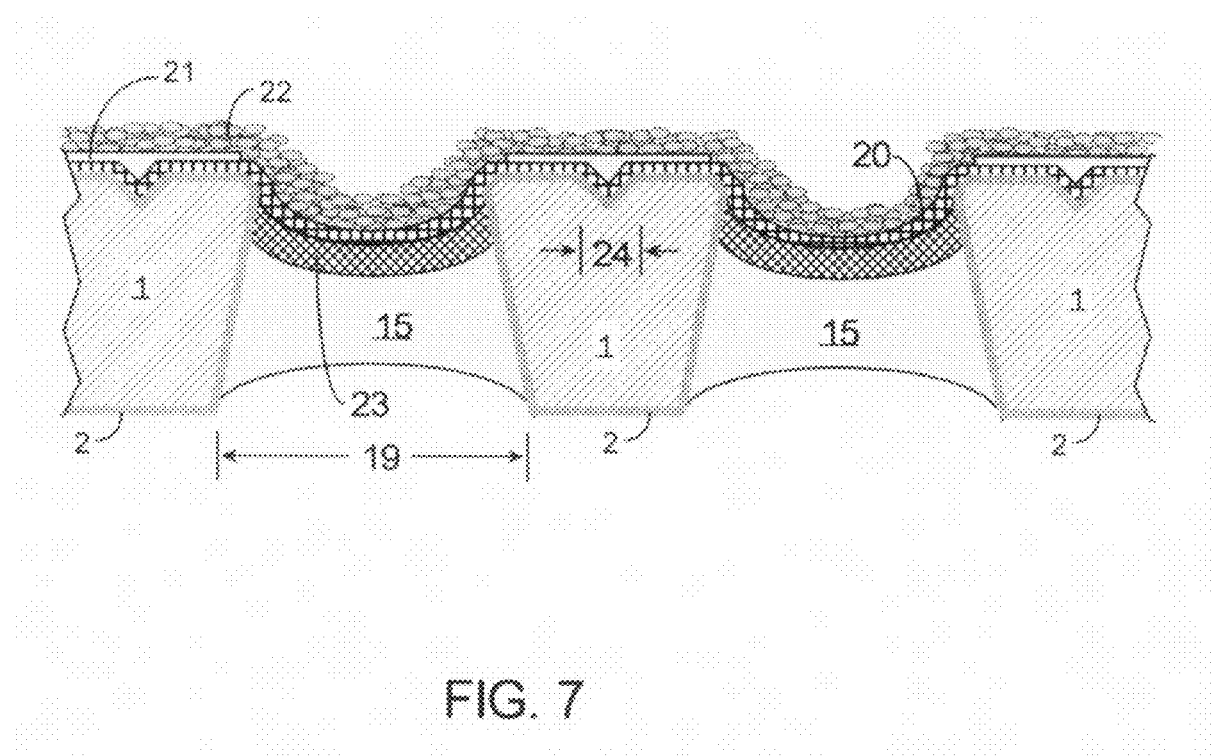
FIG. 7 is a magnified cross-section of a portion of the active region in the disclosed solid oxide electrode/electrolyte assembly, showing an alternative electrolyte structure.

In an alternative embodiment of the invention, the electrode/electrolyte structure need not be substantially planar, as in FIG. 6. In fact, it may be preferred that the electrode/electrolyte structure be formed as a periodic array of convex or concave aspects, as represented in FIG. 7. The wave-like aspect of FIG. 7 is accomplished by the original filling of the sacrificial material, wherein the wetting characteristics of the particular sacrificial material chosen, as well as any surface treatment of the support structure (17), will determine the contact angle of the sacrificial material to the through-holes (19) of the support structure. Accordingly, the resultant solidified sacrificial material (15) may form a recess in the through-hole, as in FIG. 7, so that the thin film electrolyte (20) will possess a resulting concave shape. The electrode/electrolyte structure of FIG. 7 also contains the optional first porous electrode material (22) and second porous electrode material (23) for increasing three-phase boundary interfaces or performing various reforming functions.

Such a non-planar shape, in FIG. 7, provides for additional resistance to stress-induced cracking of the electrolyte, in the case that the support structure possesses a different C.T.E. than that of the electrolyte. Furthermore, the non-planar shape of the electrolyte in FIG. 7 provides for increased surface area, and hence, increased throughput. It should be noted that the thickness of the solid oxide electrolyte (20), in FIGS. 6-7, is normally made quite thin relative the thickness of the electrode support structure. In the preferred embodiments, the solid oxide electrolyte is a film of a thickness corresponding to the thin film range (less than 10 um, or $<1 \times 10^{-5}$ meters), whereas the electrode support structure will typically possess a thickness in the range of hundreds of micrometers. While the thickness of the solid oxide electrolyte, counter-electrode, and porous electrode structures, in FIGS. 6-7, are enlarged relative to the scale of the electrode support structure, for purposes of disclosure, it may be noted that the electrode support structure may be made quite thin, so that the resulting electrode/electrolyte assembly (30) would scale proportionally similar to that in FIGS. 6-7.

In device designs incorporating materials possessing well-matched C.T.E.'s, the first porous electrode structure (23)

may be used in place of the sacrificial material (15) as a surface on which to deposit the solid oxide electrolyte. In the latter case, the through-holes would first be filled, preferably by screen printing, with a precursor form of the first porous electrode material. Sintering of the precursor/support structure would then result in a permanent porous electrode in place of the sacrificial material (15) in FIG. 7. The thickness of the first porous electrode may be made quite thin, as long as it provides a structural surface on which to deposit the solid oxide electrolyte.

Figure 8:
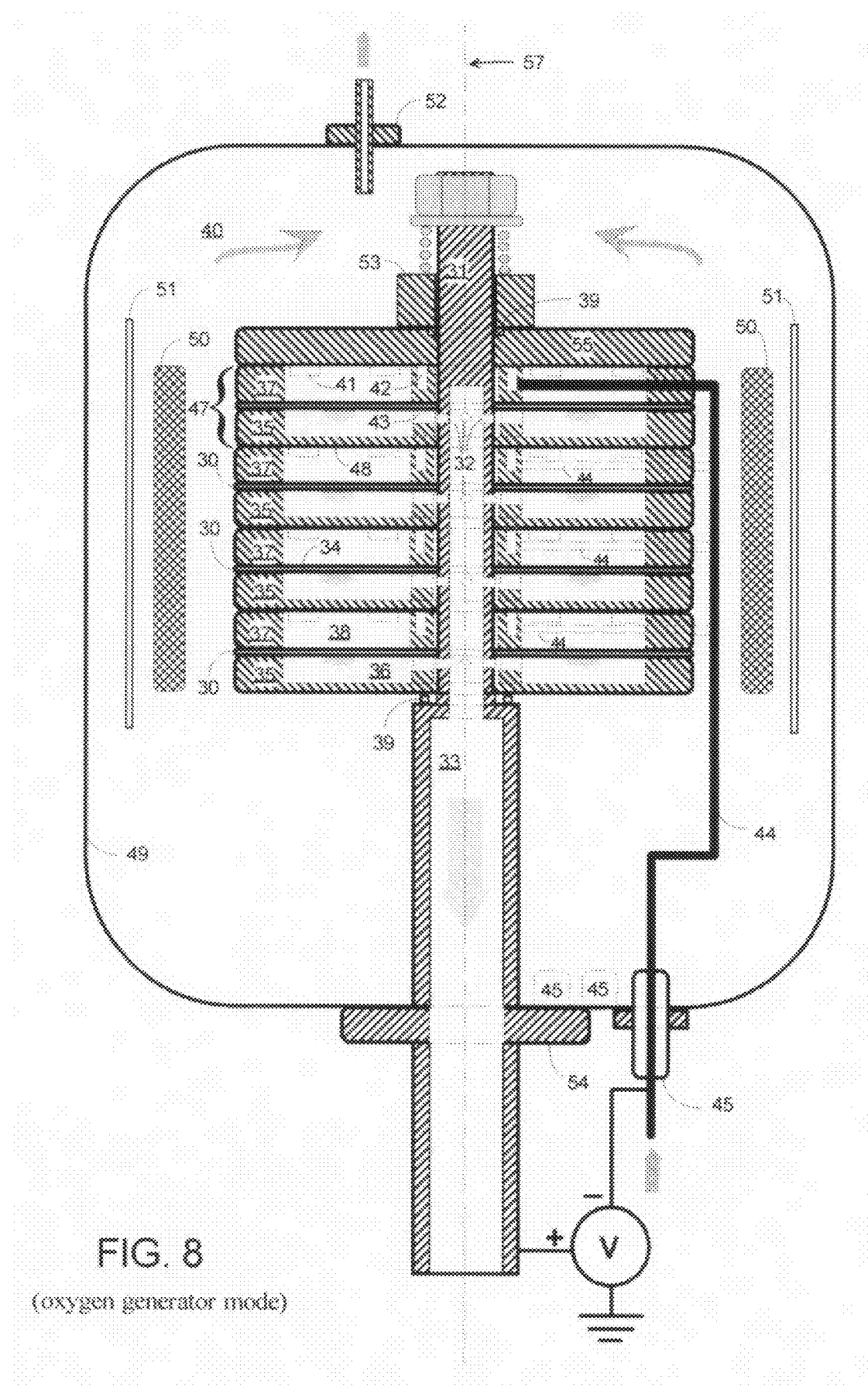
FIG. 8 is a cross-section of the disclosed solid oxide electrolytic device in a multiple-cell configuration for oxygen generation, showing peripheral gas and electrical connections.

A cross-sectional view of a solid oxide electrolytic OGS device is shown in FIG. 8, wherein the previously discussed electrode/electrolyte assembly (30) is incorporated in each cell of a multi-cell OGS device. The embodiments of FIG. 8 may be understood in conjunction with FIGS. 10-11, which provide perspective views of the cathode-side gas manifold (35), in FIG. 10, and anode-side gas manifold (37), in FIG. 11. Each individual cell (47), which includes electrode/electrolyte assembly (30), anode-side gas manifold (35), and cathode-side gas manifold (37). The power source may comprise a low voltage battery or a plug-in type power supply. Since the electrode/electrolyte assembly (30), anode-side gas manifold (35), and cathode-side gas manifold (37) each have the annular aspect of the supporting electrode structure (17) with central hole (14), in FIG. 3, the individual cells are fixed in space by mating onto a central manifold post (31), which also supports the hermetically sealed device enclosure (49) via manifold post flange (54).

In the preferred embodiments of FIG. 8, each of the bulk metal components that is subjected to high temperatures (600-800° C.)—namely, each electrode support structure (17), each anode-side gas manifold (35), each cathode-side gas manifold (37), and the central manifold post (31)—are coated with the disclosed dual-layer interconnect structure (2) of FIGS. 1-2, so that electrical contact is easily maintained between mating surfaces if a dielectric film is not subsequently deposited for insulation.

Figure 10:
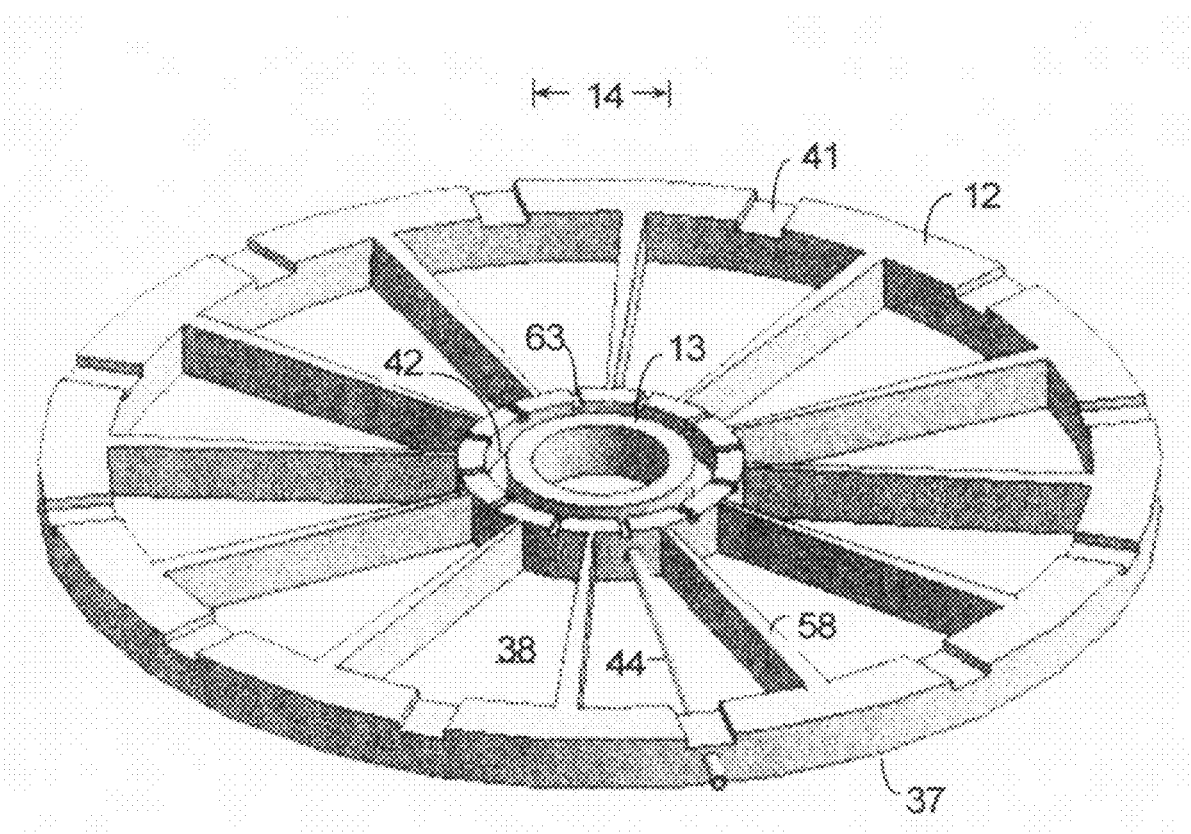
FIG. 10 is a perspective view of the disclosed cathode-side gas manifold.
Figure 11:
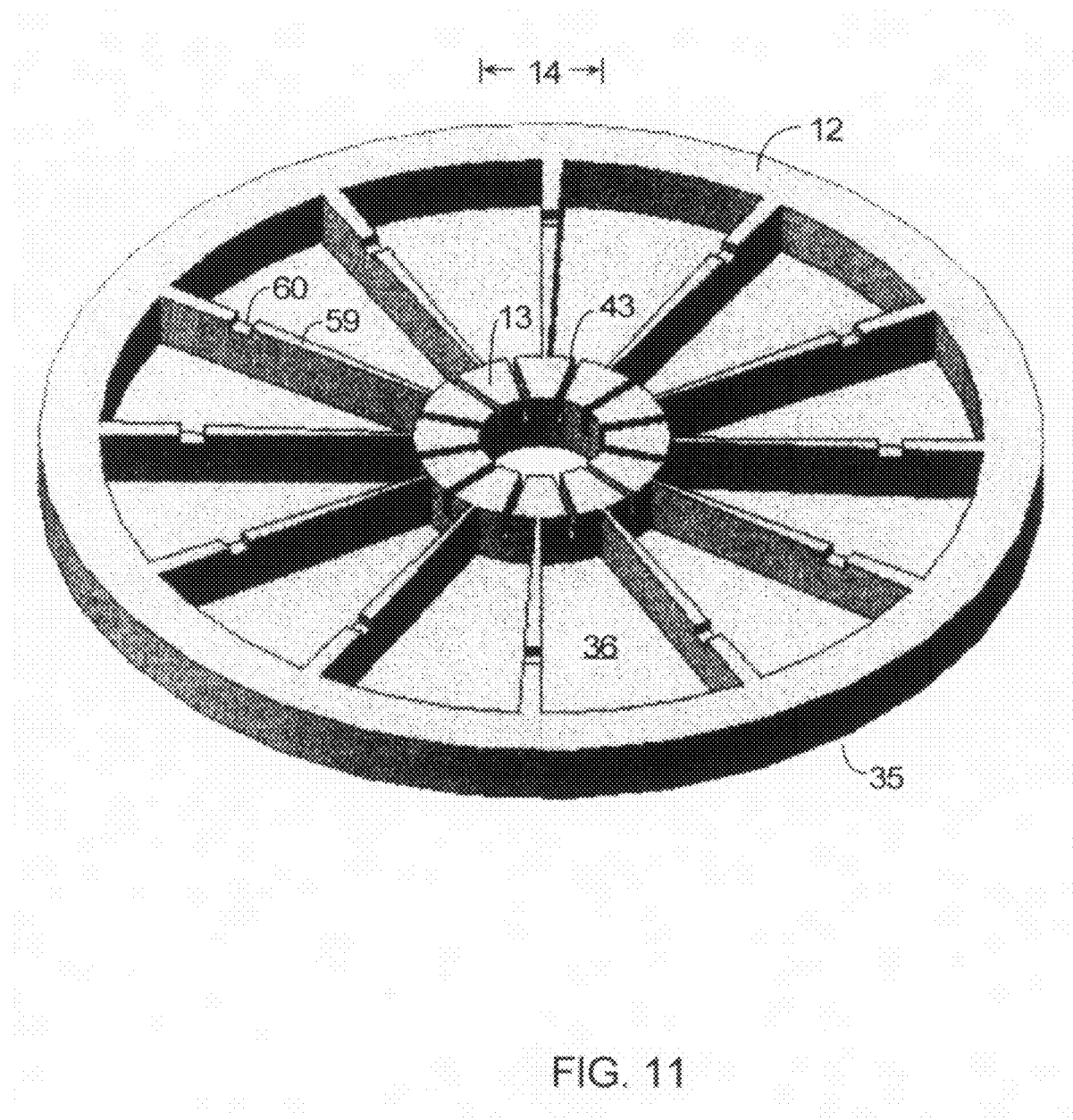
FIG. 11 is a perspective view of the disclosed anode-side gas manifold.

The sealing surfaces of the OGS device, in FIG. 8, are easily mated and maintained through device temperature cycling, since all bulk components of the individual cells and central manifold post are composed of the same Cr-containing alloy, so that thermal expansion differences do not degrade seal performance, and integrity of electrical contacts is easily maintained. Also the planar aspect of the electrode/electrolyte assembly (30), anode-side gas manifold (35), cathode-side gas manifold (37), and end plate (55), allow for each external planar surface of the initial bulk components to be ground or polished flat to optical tolerances, so that all mating surfaces may provide sufficiently gas-tight seals without application of solders or brazes, though the latter are used in the preferred embodiments. As such, the inner mating surfaces (13) and outer mating surfaces (12), in FIG. 3 and FIGS. 10-11, provide hermetic seals when joined in the device. These surfaces reside on both sides of each of the electrode/electrolyte assembly (30), anode-side gas manifold (35), and cathode-side gas manifold (37), so that subsequent application of thin film sealing materials to these surfaces will allow hermetic sealing through standard brazing or diffusion bonding practices. Because of such surfaces, gas flow is determined by the placement of the disclosed channels, such as the cathode-side channels (63), which allow even gas distribution from the gas ballast channel (42).

As is typical for OGS' and SOFC's that utilize metallic support structures, the cathode-side and anode side gas manifolds, in FIGS. 8-11, provide electrical interconnects within the individual cells, as well as to parts external to the cells. In the preferred embodiments of the disclosed OGS, in FIG. 8, the metallic gas manifolds provide electrical contact to the corresponding electrode of the disclosed electrode/electrolyte assembly (30) in each cell.

Because the planar sides of the manifolds and electrode/electrolyte assembly are each planarized to optical tolerances, electrical contact between the gas manifolds and the electrodes of the electrode/electrolyte assembly can be readily provided by both the sealing connection of the mating surfaces, as well as by the contact of the gas manifold ribs, (58) in FIG. 10 and (59) in FIG. 11, to the active region (11) of the electrode/electrolyte assembly. The co-planar, planarized surfaces of the cathode-side gas manifold (37) includes, on each of its planar sides, the corresponding surfaces of each of the cathode manifold ribs (58) and the corresponding inner mating surface (13) and outer mating surface (12). These co-planar surfaces exist on both sides of the planar cathode-side gas manifold of FIG. 10. Likewise, both sides of the anode-side gas manifold (35), in FIG. 11, comprise planarized surfaces, with co-planar inner mating surface (13), outer mating surface (12), and the corresponding planar surfaces of each of the anode manifold ribs (59) existing on the electrolyte side of the anode-side gas manifold. The underside of the anode-side gas manifold, in FIG. 11, is also planarized to provide a mating surface to the corresponding mating surfaces of the cathode-side manifold in an adjacent cell, as shown in FIG. 8, wherein the bipolar mating interface (48) between the anode-side manifold and cathode-side manifold of different cells may be either conducting or insulating, depending on whether the individual cells are operated, electrically, in series or in parallel.

Figure 9:
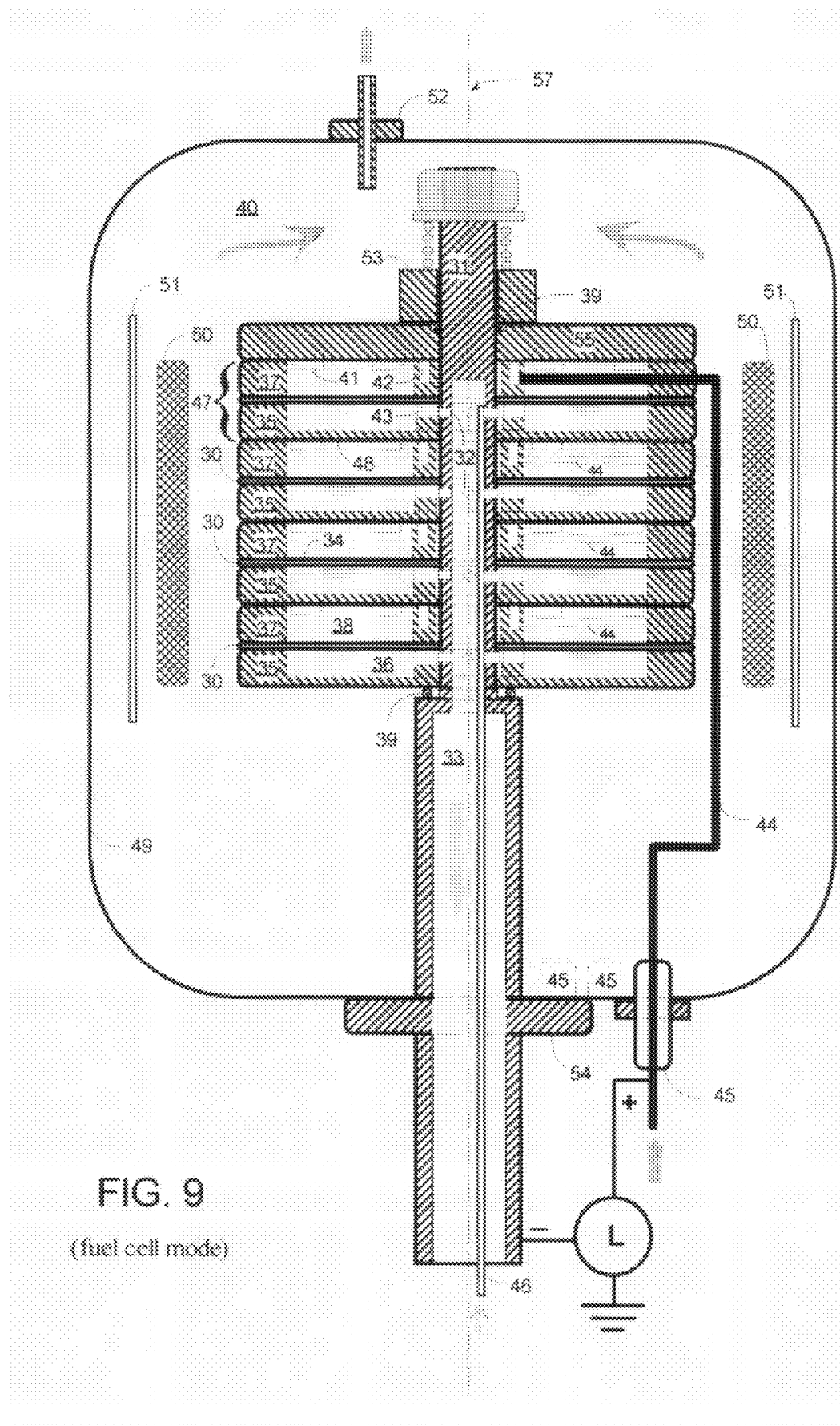
FIG. 9 is a cross-section of the disclosed solid oxide electrolytic device in a multiple-cell configuration for electrical power generation, showing peripheral gas and electrical connections.

When, as in the preferred embodiments of FIGS. 8-9, the individual cells of the disclosed OGS stack are connected electrically in series, each individual cell will be accordingly provided gas by its own electrically isolated (metallic) feed gas supply line (44) and insulated gas feed-through (45), whereas the electron current will enter the multi-cell OGS stack via the top-most supply line, which is also an electrical conduit, as indicated in FIG. 8. When connected in series, the electron current will accordingly pass through the series of individual cells to exit from the bottom-most anode-side gas manifold (35) via the central manifold post, through which the electron current may then return to the power supply 'V'. Alternatively, the cells may also be operated, electrically, in parallel, in which case, a single feed gas supply line may provide both gas and electron current to the cathode-side gas manifold of each individual cell, and each anode-side manifold is electrically contacted to the central manifold post (31).

In the case of either parallel or serial electrical connection of the individual cells, providing the required electrically insulating or conducting connections between the various bulk metal components of FIG. 8 may be readily obtained by selectively depositing a dielectric thin film—such as unmodified $ZrO_2$—to those surfaces that require electrical insulation between them. For instance, if the individual cells are to be connected, electrically, in parallel, then the surfaces of the anode-side gas manifold (35) and cathode-side gas manifold (37) that form a bipolar mating interface (48), as well as mating surfaces between the central manifold post and the cathode-side gas manifolds, would be coated with an insulating layer. Similarly, if the individual cells are to be connected, electrically, in series, then the mating surfaces between the central manifold post and the gas manifolds would be coated with insulating material, except for those surfaces that mate the bottom-most anode-side gas manifold, in either FIG. 8 or FIG. 9. Similarly, any other surface requiring insulating properties is coated with an insulating $ZrO_2$ film, thereby readily implementing the required conduction paths required for any of a variety of solid oxide electrolytic devices that may benefit from the disclosed improvements. For example, to provide a particular voltage-current relationship, a section of two or more consecutive cells in a particular stack may be operated, electrically, in series, whereas various sections may be operated, electrically, in parallel.

The device enclosure defines an enclosure space (40) that provides a return path for gas exiting the cathode-side manifolds through peripheral channels (41). An axis of circular symmetry (57) indicates rotational symmetry for elements in FIG. 8 that are symmetrical about the axis. The multi-cell stack in FIG. 8 is maintained at operating temperature by a heating element (50), which may be used in conjunction with various insulating schemes and heat reflecting surfaces (51). Supply of oxygen containing gases for purification are provided through an insulated gas feedthrough (45) and feed gas supply line (44), which provide the feed gas into the cathode-side manifold space (38), by way of a ballast channel (42) formed in the cathode-side gas manifold (37), wherein the feed gas may be made to contact the active region of the electrode/electrolyte assembly by various relief structures commonly used in gas manifolds of similar solid oxide electrolytic devices. The feed gas is circulated by exiting the gas through peripheral channels (41) into the space of the hermetically sealed device enclosure (49), where it may then exit through a feed gas return feed-through (52). In each of the individual cells, oxygen is transported through the solid oxide electrolyte that is incorporated onto the electrode/electrolyte assembly (30). The transported oxygen may then pass into anode manifold space (36) of the anode-side gas manifold (35), as indicated by gray arrows. The transported oxygen of each individual cell is allowed into the central gas flow space (33) of the central manifold post (31) through gas manifold ports (32), so that the oxygen may then be provided to a desired application.

Since the counter-electrode structure (21), in FIGS. 6-7, has a finite thickness that extends above the surface of the solid oxide electrolyte (20), the active region (11) is not precisely co-planar with the mating surfaces of the first side (16) of the resultant electrode/electrolyte assembly (30). Because of this difference, the side of the cathode-side gas manifold (37) that mates to the electrode/electrolyte assembly will contact the counter-electrode structure (21) first, so that the cathode manifold ribs will contact the active region of the electrode/electrolyte assembly while the corresponding mating surfaces of cathode-side manifold and electrode/electrolyte assembly will be separated by the thickness of the counter-electrode structure. Since the counter electrode structure will typically be less than one micrometer thick, such a difference may be easily removed by depositing an equal thickness, or slightly greater, of a sealing material to the inner and outer mating surfaces of either the cathode-side manifold or electrode/electrolyte assembly. Subsequent compression of the multicell stack with the fastener assembly (53) will then result in contact between the entire co-planar surface of the cathode-side manifold to the mating surfaces and active region of the electrode/electrolyte assembly.

It may be noted, in FIG. 8, that the mating surfaces of the electrode support structure (17) in each electrode/electrolyte assembly (30), of each anode-side gas manifold (35), and of each cathode-side gas manifold (37), provide a hermetic seal between the various manifold spaces, so that fluid communication between each anode manifold space (36) and the central gas flow space (33) is provided by anode gas channels (43) and gas manifold ports (32). The interstitial volume residing between all anode gas channels (43) and gas manifold ports (32), is then hermetically sealed by metal gaskets (39) at the top and bottom of the multicell stack. A fastener assembly (53) is implemented to provide compressive force for compressing all seals of the multicell stack.

A cross-sectional view of a multi-cell SOFC stack is shown in FIG. 9, wherein the previously discussed electrode/electrolyte assembly (30) is incorporated in each cell of a multi-cell device. The flow path of electrons through each cell of the SOFC of FIG. 9 is identical to that of the OGS of FIG. 8, with the same structural elements recited in FIG. 8 incorporated into the SOFC of FIG. 9, so that oxygen diffusion through the solid oxide electrolyte is now driven by reaction with a fuel supplied to the anode-side manifold for interaction with the solid oxide electrolyte, in accordance with standard SOFC operation. Accordingly, the structure of the SOFC assembly of FIG. 9 comprises like numbered parts identical to those of the OGS assembly, in FIG. 8. In addition to the structural elements of FIG. 8, the SOFC of FIG. 9 can incorporate various additional structural elements, internally of externally, for performing various functions particular to SOFC operation, such as reformation structures for reforming a particular fuel, or structural means for management and utilization of excess evolved heat. As in the case of the OGS of FIG. 8, the embodiments of FIG. 9 may be understood in conjunction with FIGS. 10-11, which provide perspective views of the cathode-side gas manifold (35), in FIG. 10, and anode-side gas manifold (37), in FIG. 11.

As in the case of the previous OGS device of FIG. 8, the cells are connected in series, but may be connected in parallel, depending on the nature of the application, which, in the SOFC of FIG. 9, will include some electrical load 'L', being driven by the SOFC device. As in FIG. 8, selective application of an electrically insulating $ZrO_2$ film to appropriate surfaces of the SOFC stack in FIG. 9 will allow for the individual cells to be operated either in series or in parallel; or, alternatively, for groups of serially coupled cells to be connected in parallel to the central manifold post (31).

In addition to the structural embodiments of FIG. 8, circulation of the fuel through the anode-side manifolds of the SOFC assembly, in FIG. 9, is enhanced through implementation of a fuel supply line (46). The fuel supply line provides fuel to a portion of the anode gas channels (43) of each anode-side gas manifold, so that the gas may circulate within the cell, by way of circulation channels (60), with by-products exiting through the remaining anode gas channels. Therefore, the fuel supply line (46) and gas flow space (33) provide supply and return paths for the circulating fuel and exiting by-products.

The particular structures of the cathode-side gas manifold (35), in FIG. 10, and anode-side gas manifold (37), in FIG. 11, are chosen for the purpose of effectively disclosing the invention. There are a wide variety of alternative structures that can effectively incorporate the novel improvements of the present disclosure. For instance, a wide variety of gas control structures are discussed in the prior art for effectively delivering gas to the solid oxide electrolyte, and, in many cases, such structures may be readily adapted to the present invention by one of normal skill in the art of solid oxide electrolytic devices. For example, various additional gas control structures may be incorporated into the gas manifolds disclosed in FIGS. 10-11 for effecting a particular viscous flow pattern.

It is also to be understood that the structures of FIGS. 1-11 are used herein to effectively convey the novel aspects of the present invention. Of course, the disclosed structures would, in practice, be integrated into a wide variety of surrounding structures, including those of various gas, temperature, electrical, and pressure control means. A wide variety of designs for such structures are discussed in detail in the prior art.

Similarly, while platinum is found to provide the optimum combination of inertness, thermal expansion match, oxygen diffusion barrier, high-temperature compatibility, and electrical conductivity, other metals may also be effectively used as the GDB layer without departing from the scope of the invention.

Although the present invention has been described in detail with reference to the embodiments shown in the drawing, it is not intended that the invention be restricted to such embodiments. It will be apparent to one practiced in the art that various departures from the foregoing description and drawings may be made without departure from the scope or spirit of the invention.

What is claimed is:

1. A solid oxide fuel cell having an integral electrolyte-electrode assembly, the electrolyte-electrode assembly comprising a thin planar support structure, the planar structure having a first side and a second side, the structure patterned with a plurality of pre-determined through-hole structures, the through-hole structures each having a hole interior surface extending between the first side and the second side, the hole interior surface defining an opening in the support structure, a solid oxide electrolyte disposed within each through-hole structure, the solid oxide electrolyte having a first layer side, the first layer side having a first region wherein the first layer side is attached to the interior surface, the first layer side having a second region wherein the first layer side is not attached to the interior surface, the second region spanning the opening, the second region non-planar.

2. The solid oxide fuel cell of claim 1, wherein the planar support structure comprises a metal structure that is coated with at least one material layer.

3. The solid oxide fuel cell of claim 1 wherein the second region is concave.

4. The solid oxide fuel cell of claim 1 wherein the second region is convex.

5. The solid oxide fuel cell of claim 1 wherein the support structure is a steel sheet of thickness on the order of one-hundred micrometers.

6. The solid oxide fuel cell of claim 5 wherein the steel includes a material selected from the group consisting of martensites, ferrites, and austenites.

7. The solid oxide fuel cell of claim 1 wherein the solid oxide electrolyte has a thickness less than ten micrometers.

8. The solid oxide fuel cell of claim 1 wherein a barrier layer is formed over the hole interior surface prior to forming the solid oxide electrolyte.

9. The solid oxide fuel cell of claim 8 wherein the barrier layer comprises an electrically conducting metal oxide.

10. The solid oxide fuel cell of claim 1 wherein one or more layers of the fuel cell is nanocrystalline.

11. The solid oxide fuel cell of claim 1 wherein the second region has a non-planar shape resulting from the shape of an underlying sacrificial material.

12. The solid oxide fuel cell of claim 1 wherein the solid oxide electrolyte is stabilized zirconia, and includes a thickness of about 0.01 micrometers to about 0.10 micrometers.

13. A method for forming a solid oxide fuel cell, comprising:
 a) forming a structural element, the structural element in the form of a thin layer having a first side and a second side, the structural element having a plurality of predetermined hole structures formed in the first side, the hole structures integral to a sacrificial material forming a bottom surface within each hole structure, the bottom surface a non-planar surface;
 b) forming a solid oxide electrolyte layer over the hole structure and bottom surface;
 c) removing the sacrificial material so as to provide a free-standing solid oxide electrolyte, the free-standing solid oxide electrolyte disposed within each hole structure so as to provide an effective gas barrier to a gas passing into the through-holes; and,
 d) forming electrode layers on opposing sides of the solid oxide electrolyte, the electrode layers disposed for enabling oxygen transport through the solid oxide electrolyte.

* * * * *